US008346212B2

(12) United States Patent
Breitzman et al.

(10) Patent No.: US 8,346,212 B2
(45) Date of Patent: Jan. 1, 2013

(54) RESOURCE AND UTILIZATION MANAGEMENT OF TELECOMMUNICATION DEVICES

(76) Inventors: James Breitzman, New Berlin, WI (US); Jonathan Brown, Howell, MI (US)

(*) Notice: Subject to any disclaimer, the term of this patent is extended or adjusted under 35 U.S.C. 154(b) by 140 days.

(21) Appl. No.: 13/083,339

(22) Filed: Apr. 8, 2011

(65) Prior Publication Data

US 2011/0250865 A1 Oct. 13, 2011

Related U.S. Application Data

(60) Provisional application No. 61/321,917, filed on Apr. 8, 2010.

(51) Int. Cl.
*H04M 11/00* (2006.01)
(52) U.S. Cl. ............ 455/406; 455/405; 455/414.1; 705/400
(58) Field of Classification Search .......... 455/406, 455/405, 414.1; 705/400
See application file for complete search history.

(56) References Cited

U.S. PATENT DOCUMENTS

| 5,027,388 | A | 6/1991 | Bradshaw | |
|---|---|---|---|---|
| 7,486,944 | B2 | 2/2009 | Carpenter | |
| 2002/0032019 | A1* | 3/2002 | Marks et al. | 455/414 |
| 2010/0075630 | A1* | 3/2010 | Tillitt et al. | 455/406 |

* cited by examiner

*Primary Examiner* — Nghi H Ly
(74) *Attorney, Agent, or Firm* — Mohr Intellectual Property Law Solutions, PC

(57) ABSTRACT

Methods and systems for resource and utilization management of telecommunications devices within an enterprise, where the enterprise contracts for telecommunications service from one or more service providers, comprising components configured to receive quantity data corresponding to the amount of telecommunications service used by the enterprise per period into a resource management system including a microprocessor executing programmed instructions, group telecommunications devices into pools of shared use for the telecommunications service, the pools of shared use including one or more telecommunication devices, analyze for each telecommunications device telecommunications services plans available from the service providers to determine the total quantity of telecommunications service provided by the service providers and the cost per unit of telecommunications service, select selected telecommunications service plans for each telecommunications device that accommodate a target quantity of projected telecommunications service use per period, and subscribe the telecommunications devices to the selected service plans.

21 Claims, 5 Drawing Sheets

RESOURCE AND UTILIZATION MANAGEMENT OF TELECOMMUNICATION DEVICES

This application claims the benefit of U.S. Application, Ser. No. 61/321,917, filed on Apr. 8, 2010, which is hereby incorporated by reference for all purposes.

BACKGROUND

The present disclosure relates generally to telecommunications and wireless expense management. In particular, methods and systems for resource planning and utilization management of telecommunications devices within enterprise are described herein.

Telecommunication devices within an enterprise are a complex field for users, financial managers, procure gent officers, and other corporate users. Billing, reporting, provisioning, and procurement follows arcane methods developed by the telecommunication service providers to maximize profits for their services.

Numerous techniques have been developed for optimizing billing, particular in the wireless telecommunication space, based on the best available service plans and the past history of telecommunication device usage. Use of past history to predict wireless use and to choose a wireless plan accordingly is presented in U.S. Pat. No. 7,486,944 by Carpenter et al. Use of history and usage pattern to select the most cost effective wireless plan for each user is presented in U.S. Pat. No. 5,027,388 by Bradshaw et al. The complete disclosures of the above patents and patent applications are herein incorporated by reference for gall purposes.

These solutions provide a per-device approach that ultimately relies on the telecommunication service provider(s) billing a plan back to each device. These do not account for the increasing flexibility and availability of pooling resources and aggregate purchasing of telecommunication services. There is no solution currently in use for providing allocation of telecommunications devices within an enterprise from multiple service providers allowing for aggregate purchase of telecommunication services and usage based chargeback of services to individual users within the enterprise.

Disclosure addressing one or more of the existing needs in the industry is provided in the detailed description below. The methods and systems described below relate generally to resource management and more specifically they relates to methods and systems for resource planning and utilization management of telecommunications devices within an enterprise to optimize the delivery of telecommunications services to maximize matching services with usage while minimizing cost.

SUMMARY

The methods and systems for resource planning and utilization management of telecommunications devices within an enterprise generally relates to a resource management which includes an enterprise having a centralized resource manager, agents, and telecom devices used by agents; a service provider, providing telecom services measured by a usage meter; and a resource management system having a usage analyzer, service plan optimizer, and resource planner There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide methods and systems for resource planning and utilization management of telecommunications devices within an enterprise to optimize the delivery of telecommunications services to maximize matching services with usage while minimizing cost through analysis of usage and the available service plans to set the appropriate distribution of telecommunication resources to agents of the enterprise.

Another object is to provide methods and systems for resource planning and utilization management of telecommunications devices within an enterprise that provides accountability and direct reporting on resource charges and usage by any particular agent.

Another object is to provide methods and systems for resource planning and utilization management of telecommunications devices within an enterprise that uses pooling plans that allow sharing of resources across all agents in the enterprise to minimize cost for a total service use, allowing enterprise to purchase pooling minutes from the service provider at the lowest cost combination of plans without concern for how they will charge back agents for the costs associated with their consumption of services.

Another object is to provide methods and systems for resource planning and utilization management of telecommunications devices within an enterprise that optimizes the telecommunication service plans on telecomm devices based on agent geography and local tax jurisdictions.

Another object is to provide methods and systems for resource planning and utilization management of telecommunications devices within an enterprise that permits identification of different usage patterns of telecommunications services based on the different business functions performed by different agents in the enterprise.

Another object is to provide methods and systems for resource planning and utilization management of telecommunications devices within an enterprise is the ability to provide an exact chargeback of each agent's costs associated with each agent's consumption of services. The exact cost per agent is based on a rate per unit of consumption which the tool calculates.

Other objects and advantages of the present invention will become clear to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Various other objects, features and attendant advantages of the present invention will become more fully appreciated as the same becomes better understood when considered in conjunction with the accompanying drawing:

FIG. 1 shows a schematic view of a programmable computing device.

DETAILED DESCRIPTION

The disclosed methods and systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various systems and methods are provided. Related features in the examples may be identical, similar, or dissimilar in different examples. For the sake of brevity, related features will not be redundantly explained in each example. Instead the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Various examples of the systems and methods may be implemented using electronic circuitry configured to perform one or more functions. For example, with some embodiments of the invention, the systems and methods may be implemented using one or more application-specific integrated circuits (ASICs). More typically, however, components of various examples of the invention will be implemented using a programmable computing device executing firmware or software instructions, or by some combination of purpose-specific electronic circuitry and firmware or software instructions executing on a programmable computing device.

Figure 1:
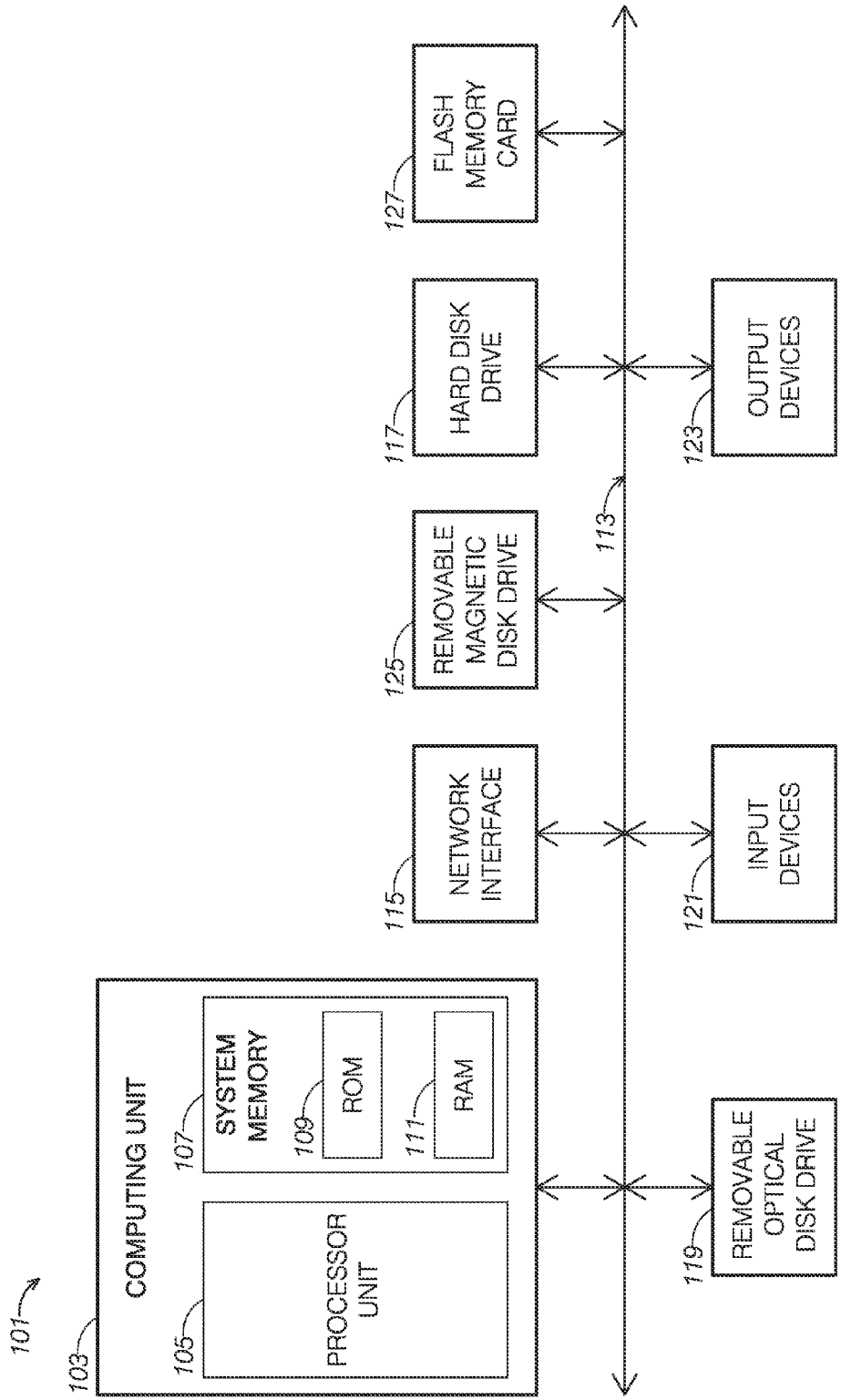

Accordingly, FIG. 1 shows one illustrative example of a computer 101 that can be used to implement various embodiments of the invention. Computer 101 may be incorporated within a variety of consumer electronic devices, such as personal media players, cellular phones, smart phones, personal data assistants, global positioning system devices, and the like.

As seen in this figure, computer 101 has a computing unit 103. Computing unit 103 typically includes a processing unit 105 and a system memory 107. Processing unit 105 may be any type of processing device for executing software instructions, but will conventionally be a microprocessor device. System memory 107 may include both a read-only memory (ROM) 109 and a random access memory (RAM) 111. As will be appreciated by those of ordinary skill in the art, both read-only memory (ROM) 109 and random access memory (RAM) 111 may store software instructions to be executed by processing unit 105.

Processing unit 105 and system memory 107 are connected, either directly or directly, through a bus 113 or alternate communication structure to one or more peripheral devices. For example, processing unit 105 or system memory 107 may be directly or indirectly connected to additional memory storage, such as a hard disk drive 117, a removable optical disk drive 119, a removable magnetic disk drive 125, and a flash memory card 127. Processing unit 105 and system memory 107 also may be directly or indirectly connected to one or more input devices 121 and one or more output devices 123. Input devices 121 may include, for example, a keyboard, touch screen, a remote control pad, a pointing device (such as a mouse, touchpad, stylus, trackball, or joystick), a scanner, a camera or a microphone. Output devices 123 may include, for example, a monitor display, an integrated display, television, printer, stereo, or speakers.

Still further, computing unit 103 will be directly or indirectly connected to one or more network interfaces 115 for communicating with a network. This type of network interface 115, also sometimes referred to as a network adapter or network interface card (NIC), translates data and control signals from computing unit 103 into network messages according to one or more communication protocols, such as the Transmission Control Protocol (TCP), the Internet Protocol (IP), and the User Datagram protocol (UDP). These protocols are well known in the art, and thus will not be discussed here in more detail. An interface 115 may employ any suitable connection agent for connecting to a network, including, for example, a wireless transceiver, a power line adapter, a modem, or an Ethernet connection.

It should be appreciated that, in addition to the input, output and storage peripheral devices specifically listed above, the computing device may be connected to a variety of other peripheral devices, including some that relay perform input, output and storage functions, or some combination thereof. For example, the computer 101 may be connected to a digital music player, such as an IPOD® brand digital music player IPHONE® or Droid® brand smartphone available from Apple, Inc. of Cupertino, Calif. As known in the art, this type of digital music player can serve as both an output device for a computer (e.g., outputting music from a sound file or pictures from an image file) and a storage device.

In addition to a digital music player, computer 101 may be connected to or otherwise include one or more other peripheral devices, such as a telephone. The telephone may be, for example, a wireless "smart phone," As known in the art, this type of telephone communications through a wireless network using radio frequency transmissions. In addition to simple communication functionality, "smart phone" may also provide a user with one or more data management functions, such as sending, receiving and viewing electronic messages (e.g., electronic mail messages, SMS text messages, etc.), recording or playing back sound files, recording or playing back image files (e.g., still picture or moving video image files), viewing and editing files with text (e.g., Microsoft Word or Excel files, or Adobe Acrobat files), etc. Because of the data management capability of this type of telephone, a user may connect the telephone with computer 101 so that their data maintained may be synchronized.

Of course, still other peripheral devices may included with or otherwise connected to a computer 101 of the type illustrated in FIG. 1, as is well known in the art. In some cases, a peripheral device may be permanently or semi permanently connected to computing unit 103. For example, with many computers, computing unit 103, hard disk drive 117, removable optical disk drive 119 and a display are semi-permanently encased in a single housing.

Still other peripheral devices may be removably connected to computer 101, however. Computer 101 may include, for example, one or more communication ports through which a peripheral device can be connected to computing unit 103 (either directly or indirectly through bus 113). These communication ports may thus include a parallel bus port or a serial bus port, such as a serial bus on using the Universal Serial Bus (USB) standard or the IEEE 1394 High Speed Serial Bus standard (e.g., a Firewire port). Alternately or additionally, computer 101 may include a wireless data "port," such as a Bluetooth® interface, a Wi-Fi interface, an infrared data port, or the like.

It should be appreciated that a computing device employed according various examples of the invention may include more components than computer 101 illustrated in FIG. 1, fewer components than computer 101, or a different combination of components than computer 101. Some implementations of the invention, for example, may employ one or more computing devices that are intended to have a very specific functionality, such as a digital music player or server computer. These computing devices may thus omit unnecessary peripherals, such as the network interface 115, removable optical disk drive 119, printers, scanners, external hard drives, etc. Some implementations of the invention may alternately or additionally employ computing devices that are intended to be capable of a wide variety of functions, such as a desktop or laptop personal computer. These computing devices may have any combination of peripheral devices or additional components as desired.

Figure 2:
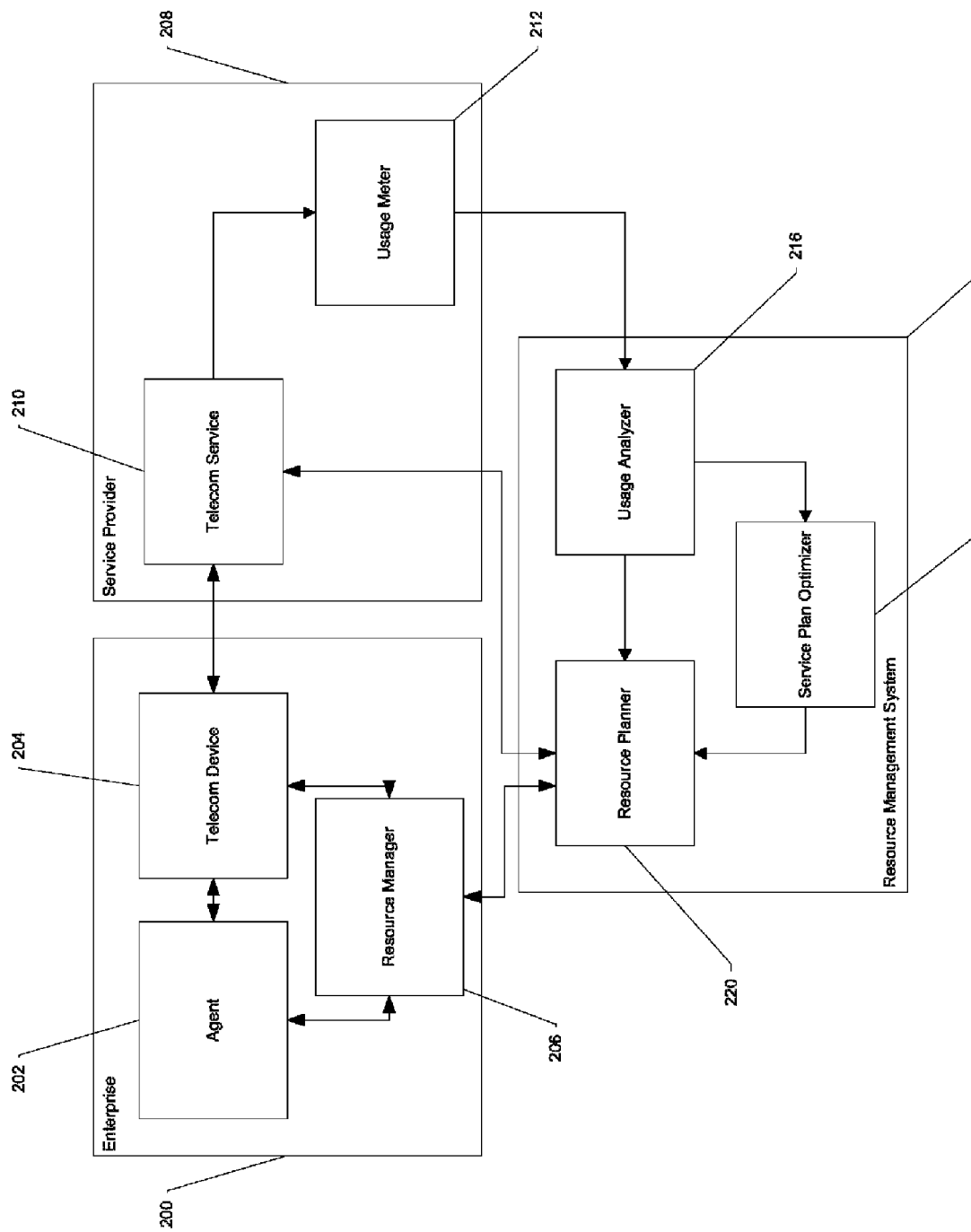
FIG. 2 is a flowchart of a first example of a method for resource planning and utilization management of telecommunications devices within an enterprise.

A. FIG. 2 Overview

Turning now descriptively to the drawing, FIG. 2 illustrates an enterprise having a centralized resource manager, agents, and telecom devices used by agents; a service provider, providing telecom services measured by a usage meter; and a resource management system having a usage analyzer, service optimizer, and resource planner.

B. Enterprise 200

An enterprise 200 may be a business, organization, or other entity having one or more agents using telecommunication devices with centralized resource management. Examples include, but are not limited to, a corporation, a non-profit organization, municipal government, state government, federal government, government agencies, distributed and decentralized companies, holding companies with multiple functional units.

A business enterprise be of different sizes, specialize in different products, specialize in one or more phases of product development operate at local, national, or international levels. Further, a business enterprise may be privately or publicly held.

C. Agent 202

An agent 202 may be an employee, consultant, shareholder, manger, other dual person or entity provided telecommunication services that are contracted or funded by the enterprise 200.

D. Telecom Device 204

A telecom device 204 as used herein may be a telecommunication messaging device. Examples of a suitable telecom device 204 include, but are not limited to, a cellular phone, PDA, Blackberry, telemetry device, machine to machine device, pager, cellular modem, broadband data access device, VOIP telephone, and SMS/MMS text messaging sender/receiver.

An agent 202 will be assigned one or more telecom devices 204 for using the services of said telecom device. Telecom device 204 is provisioned by the enterprise 200.

E. Resource Manager 206

A resource manager 206 serves a central administrative function within the enterprise 200. Resource manager 206 manages the assignment of telecom devices 204 to agents 202. Resource manager 206 also enters into contracts on behalf of the enterprise 200 with the service provider 208 to provide telecommunication services to agents 202 through the use of telecom devices 204.

F. Service Provider 208

A service provider 208 includes an entity or enterprise that provides telecommunication services to telecom devices 204. Examples of service providers include, but are not limited to, wireless carriers, cable companies, local telephone companies (telcos), VOIP providers, and data service providers may contract for services on a monthly fee or consumption charge per resource used, and may allow pooling of resource utilization across various telecom devices 204 within the enterprise 200.

G. Telecom Service 210

A telecommunications service (or telecom service) 210 is a specific service provided to telecom devices 204. Examples of telecommunications services 210 include, but are not limited to, voice telephone, e-mail access, broadband data, and SMS/MMS text messages.

H. Usage Meter 212

A usage meter 212 includes a device for measuring usage of a telecom service 210 to produce detailed information on how agents 202 use telecom devices 204. Examples of usage meter 212 include, but are not limited to, detailed records of use of air time, data transferred, or roaming minutes, with identification of use per telecom device 204 by date and time.

I. Resource Management System 214

A resource management system 214 includes a microprocessor with programmed instructions designed to analyze usage records as produced by the usage meter 212 and to produce recommendations to the resource manager 206 for the deployment of telecom devices 204 and contracting for telecom services 210 with service providers 208.

J. Usage Analyzer 216

A usage analyzer 216 is an information system including a microprocessor with programmed instructions to generate a profile of usage and costs telecom device 204 as well as a general profile of aggregate resource usage across the enterprise 200. Usage analyzer 216 receives the usage data generated by the usage meter 212.

An example implementation is a computer program that receives the data files from the service provider 208 as output by the usage meter 212. These data files could be any common database interchange format. This computer program then parses the data files to extract summary usage data per time period per telecom device 204.

K. Service Plan Optimizer 218

A service plan optimizer 218 an information system including a microprocessor executing programmed instructions to provide a cost analysis for the usage profile of the telecom devices 204 based on service plans. Service plan optimizer 218 receives the usage profile generated by the usage analyzer 216 as well as the service plans available from the service provider 208. An example of such a calculation includes the assignment of resource pooling plans for telecom service 210 for each telecom device 204 achieve minimal overall cost. Another example such a calculation includes the calculation of the cost of each service plan for telecom service 210 for each telecom device 204 based on the total cost of service plans plus taxes in the pa altar tax jurisdiction of each agent 202 to minimize total cost including taxes.

L. Resource Planner 220

A resource planner 220 is an information system including microprocessor executing programmed instructions to produce a recommendation for service plan subscriptions for telecom services 210 and location of telecom devices 204 per agent 202. Resource planner 220 takes the usage profile generated by the usage analyzer 216 and the service plan cost analysis generated by the service plan optimizer 218 to produce its recommendation. An example of the decision made by the resource planner for assignment of service plan subscriptions for telecom services 210 to the telecom device 204 for a specific agent 202 includes the use of specific, telecom services for heavy consumption. Another examples includes the minimization of total cost by assigning high allocation service plans for telecom services 210 to telecom devices 204 used by agents 202 located in favorable tax jurisdictions.

An example of the output from the resource planner includes a list of change requests assigning each telecom device 204 to a specific service contract for telecom services 210. This output is communicated to the resource manager 206 of the enterprise 200, to be separately enacted in its contracting with service provider 208 for telecom services 210.

M. Connections of Main Elements and Sub-Elements of Invention

Agents 202 use telecom device 204 to communicate via telecom service 210. As a side effect of this usage, the usage meter 212 generates transaction records detailing the resources used.

These records for usage are input to the usage analyzer 216 as raw data from the service provider 208. This data is analyzed to produce a summary of usage which is analyzed by the service plan optimizer 218 with respect to the service plans for the telecom service 210 offered by the service provider 208, including but not limited to resource pooling and taxes. The usage pattern generated by the usage analyzer 218 and this cost summary generated by the service plan optimizer 218 is input to the resource planner 220. The resource planner 220 generates a list of recommendations for resource service plans and device/agent assignment changes.

This list of changes is forwarded to the resource manager 206 for changes to the assignment of agents 202 and telecom devices 204, as well as with the service provider 208 for assignment of specific service plans for telecom service 210 to telecom devices 204.

N. Alternative Embodiments

Agent 202 may be an employee, sales agent, independent contractor, or other entity employed by or provided telecom services through enterprise 200.

Telecom device 204 may be any telecommunication product or service that is measured by consumption and provided by a telecommunications service provider 208. This could be, for example but not limited to, wireless voice, P. Blackberry, telemetry device, machine to machine device, VOIP, wireless broadband, WiFi data service, SMS/MMS text messaging.

Usage meter 212 is the plurality of monitoring and systems used by any service provider 208 to measure the usage of telecom service 210 and record the transactions, interactions, and resource usage by any telecom device 204.

Usage analyzer 216, service plan optimizer 218, and resource planner 220 be one or more computer information systems designed to take as input the usage data from service provider 208 and service plan information.

Telecom services 210 examples include but are not limited to cellular voice, broadband data, PDA, Blackberry, telemetry, machine to machine, WiFi, VOIP, and SMS/MMS text messaging.

Resource planner 220 may forward service plan changes directly to the service provider 208 or forward these to the resource manager 206 for the enterprise.

The resource manager 206 may be a functional division of enterprise 200 or an outsourced service provider, such as a telecommunications expense management company TEM. The resource manager 206 may also be a microprocessor executing programmed instructions.

O. Operation of Preferred Embodiment

In accordance with one embodiment, we consider where the mobile telecom devices 204 are cellular phones with optional data and text messaging service, and the service provider 208 is a major US wireless carrier. Agents 202 are the employees of enterprise 200, which is a large corporation.

As part of the use of cellular phones 202, the wireless carrier generates call records and data usage records indicating, per telephone number, the date and time of each call, any special roaming or other extra call costs, as well as the data transmitted or received by each device at any particular time in a regular billing cycle. Regular formatted data reports are generated by the wireless carrier as part of usage metering 212.

Further, as part of wireless service 210, each cellular phone telecom device 204 is subscribed to a pooling service plan, where each device contributes a specific number of voice minutes, data transfer, and text messages per month.

The resource management system 214 is an information system that works as follows.

Usage data is input as structured records into the usage analyzer 216, which is a data parser that extracts, for each cellular phone telecom device 204 the total of each service used: 1) Pooled voice minutes; 2) Pooled data transfer kilobytes; 3) Pooled text message count; 4) Other charges that cannot be pooled.

The service plan optimizer 218 calculates the cost of service plans each of the cellular phone telecom devices 204 based on a table of local tax rates as well as a list of add-on features.

The resource planner 220 takes as input usage data per cellular phone telecom device 204 as well as the list of possible service plans and costs from the service plan optimizer 218. It then assigns a service plan to each cellular phone to: 1) Achieve an overall amount of pooled resources sufficient to cover usage; 2) Minimize the total overall cost; 3) Provide service to each cellular phone telecom device 204.

The key metric for this optimization is the effective rate—the cost per unit of pooled resource. To achieve these goals, the systems and methods described herein may implement an algorithm as described below.

Assign to each cellular phone a service plan of minimal cost.

Select a cellular device with an alternative plan of minimum effective rate that meets or minimally exceeds the desired resource allocation and change the service plan to this alternate plan. Flag this cellular device.

Repeat the above process of selecting alternative plans for unflagged devices until one of two events occurs:

Achieve or minimally exceed the desired resource allocation sufficient to achieve the resources required to meet the usage profile.

Exhaust all available devices.

If all available devices are exhausted:

Unflag all devices.

Select the device having a second plan of minimal effective rate such that 1) the effective rate is no better than the current plan's effective rate, but 2) the pool allocation under this second plan is greater than the currently assigned plan for this device, or 3) this plan either does not exceed the desired resource allocation or it minimally exceeds it.

This iterative refinement process may have to be repeated multiple times. However, most mobile pooling plans exhibit a non-increasing cost per minute as plan pooling minutes increase. In these cases, the greedy algorithm approach achieves an optimal solution without iteration.

The result of this process is a list of cellular phone telecom devices by cellular number with the service plan assignment for each device.

P. Sample Interchange Formats and Work Products for Preferred Embodiment

As part of operation of the preferred embodiment, several artifacts will be generated. We highlight examples of those here. These are examples and do not limit of restrict the potential variations of the invention.

The usage analyzer 216 receives input files from a service provider 208. In the case of a cellular provider, these input files include a summary of active telecom devices 204 with the phone number, cost center, and service plan for each; a summary of charges allocated to each telecom device 204 by the carrier in accordance with those service plans, incidental charges, and features; and a detailed record of resources minutes, data transfer, text messages, emails, etc used according to a particular unit of measure.

The first artifact produced by the usage analyzer 216 thus embodied is called an accounts payable ledger. This serves to produce an exact allocation of expenses as follows:

First, features and other charges that cannot be allocated to a pooling resource are allocated directly to the mobile device.

Next, service plan charges are divided between pooling-allocable and non-pooling-allocable amounts, depending on whether the service plan portion is applicable to a pooling resource or not.

The total allocable service plans amounts are summed to produce the total cost for the particular pooling resource.

The total pooling resource used is calculated with an appropriate unit of measure—for voice, minutes; for broadband data, kilobytes of data transfer—producing the amount of total pooling resource consumed.

The quotient of the total cost for the particular pooling resource and the amount of that resource used produces an effective rate for use of the resource—e.g., cents per minute for voice, cents per kilobyte of data transferred.

Then, the pool-allocable portion of cost is allocated to devices based on consumption at this effective rate.

In a simple example, if there are two devices A and B, consuming 100 and 900 voice minutes, respectively, respectively, but both with $50 pooling-allocable service plan portions, the inputs from the wireless carrier would bill each $50, but the accounts payable ledger would calculate an effective rate of 10 per minute. Therefore, the allocation would be $10 to device A for consuming 100 voice minutes and $90 to device B for consuming 900 voice minutes. In this way, the accounts payable ledger allows the enterprise 200 to purchase service plans to minimize the overall cost for a pooling resource, and then to allocate the portion of that cost back to each device 204 and ultimately each agent 202 based on the total pool consumption and effective rate.

The accounts payable ledger can also be used to distribute costs in such instances as where the enterprise 200 is made of autonomous divisions, departments, or other subdivisions that have separate budgets or other internal accounting.

The accounts payable ledger provides an input to the service plan optimizer 218. The accounts payable ledger summarizes the total amount of pooled resources purchased by subscription plan as well as those consumed. The accounts payable ledger also identifies the devices by phone number, which then can be mapped to taxable region it also identifies the relevant features purchased by the enterprise.

The service plan optimizer then generates a set of plan feature and tax rate reports. These summarize, for each plan for a pooling resource in scope, the total cost for that plan in each applicable tax jurisdiction and with each relevant feature.

Both the accounts payable ledger and the set of plan feature and tax rate reports are inputs for the resource planner 220. The resource planner combines these inputs to generate a set of detailed reports on usage of telecom devices.

A device plan optimization includes an assignment of service plans to devices.

Figure 3:
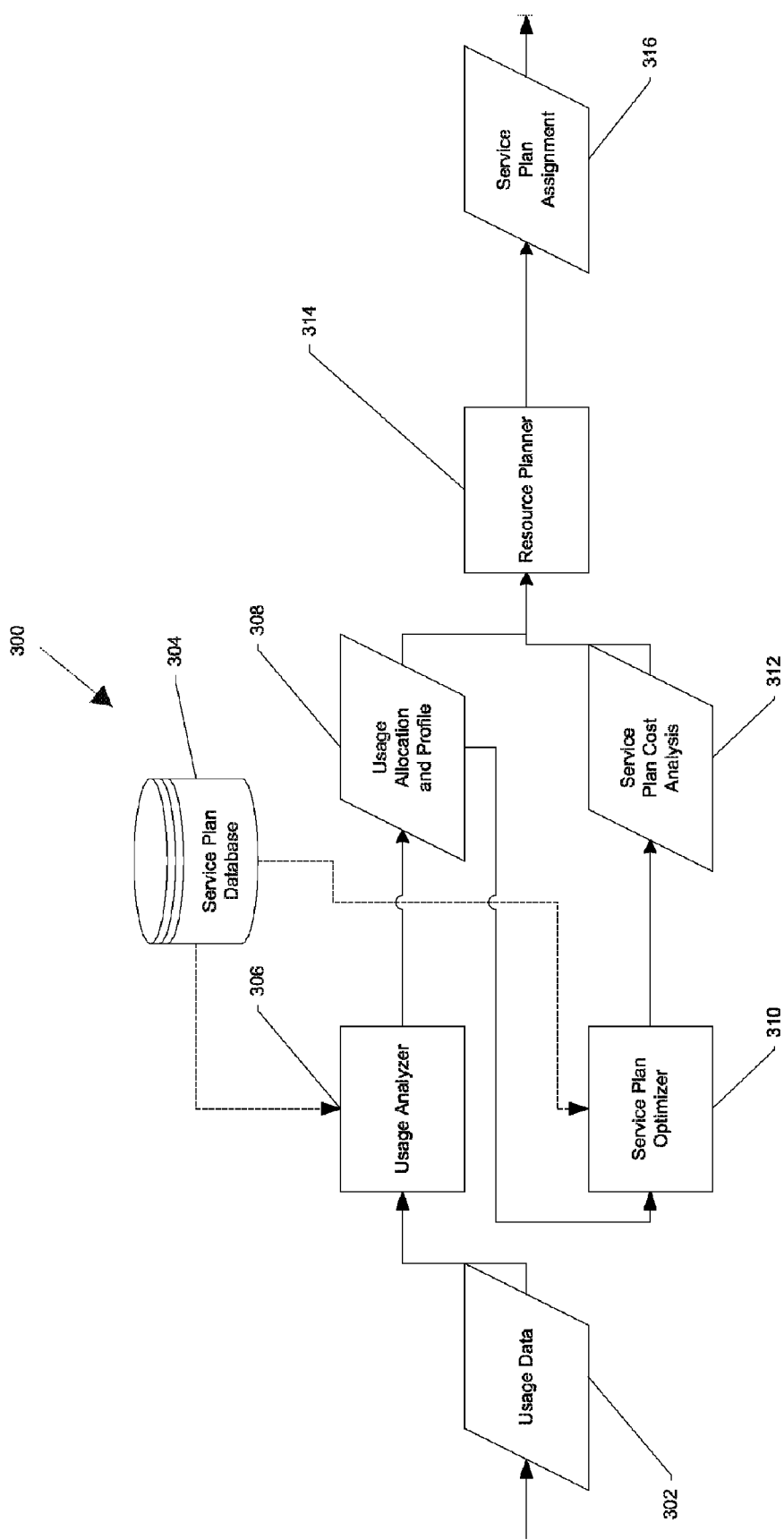
FIG. 3 is flowchart of a first example of a system for resource management.

Q. FIG. 3. Resource Management System

Turning now descriptively to the drawing, FIG. 3 illustrates a system for resource management, showing process steps within the resource management system having a usage analyzer, service plan optimizer, and resource planner.

The resource management system 300 includes usage data 302 received from the telecommunication service provider. Examples include, but are not limited to, call detail records, detailed billing and usage of service, per device subscription plans.

Usage analyzer 306 takes as input the usage data 302 and service plan database 304 to product usage allocation and profile 308.

Service plan database 304 is a database used by usage analyzer 306 and service plan optimizer 310 to decode the usage data record, current telecommunication service plan subscriptions, and possible alternative service plan subscriptions. Examples include, but are not limited to, an electronic database of service plans, a lexical parser programmed to extract service plan details from textual descriptions, a list of service plan codes and features.

Usage allocation and profile record 308 is output produced by the usage analyzer that includes a per-device summary of usage of telecommunications service, features and incidental charges, and a profile of the aggregate demand of telecommunications service. Examples include, but are not limited to, a database keyed by device telephone number, with total minutes of voice airtime or bytes, kilobytes, or other conventional unites of data transfer used, as well as the amount of service used and the service plan subscription per device.

Service plan optimizer 310 takes as input the usage allocation and profile 308 and uses the service plan database 304 to produce service plan cost analysis records 312. Service plan cost analysis records 312 is output from the service plan optimizer 310 that includes the available plans, the features and capacity of each plan for the telecommunications service, and the total and unit cost per plan. Examples include, but are not limited to, a list of data subscription plans by total transfer and cost per kilobyte, a list of voice plans by maxima voice minutes and cost per minute, and the same list sorted by tax jurisdictions included in the usage profile weighted by total cost including all taxes and surcharges.

Resource planner 314 takes as input the usage allocation and profile 308 and the service plan cost analysis and generates a service plan assignment 316. Service plan, assignment 316 is output produced by resource planner 314 that includes per-device subscription plan changes. Examples include, but are not limited to, a listing of each telecommunications device, its current plan, and the suggested alternative service plan; the same extended to include the current usage and projected cost under the new plan.

Figure 4:
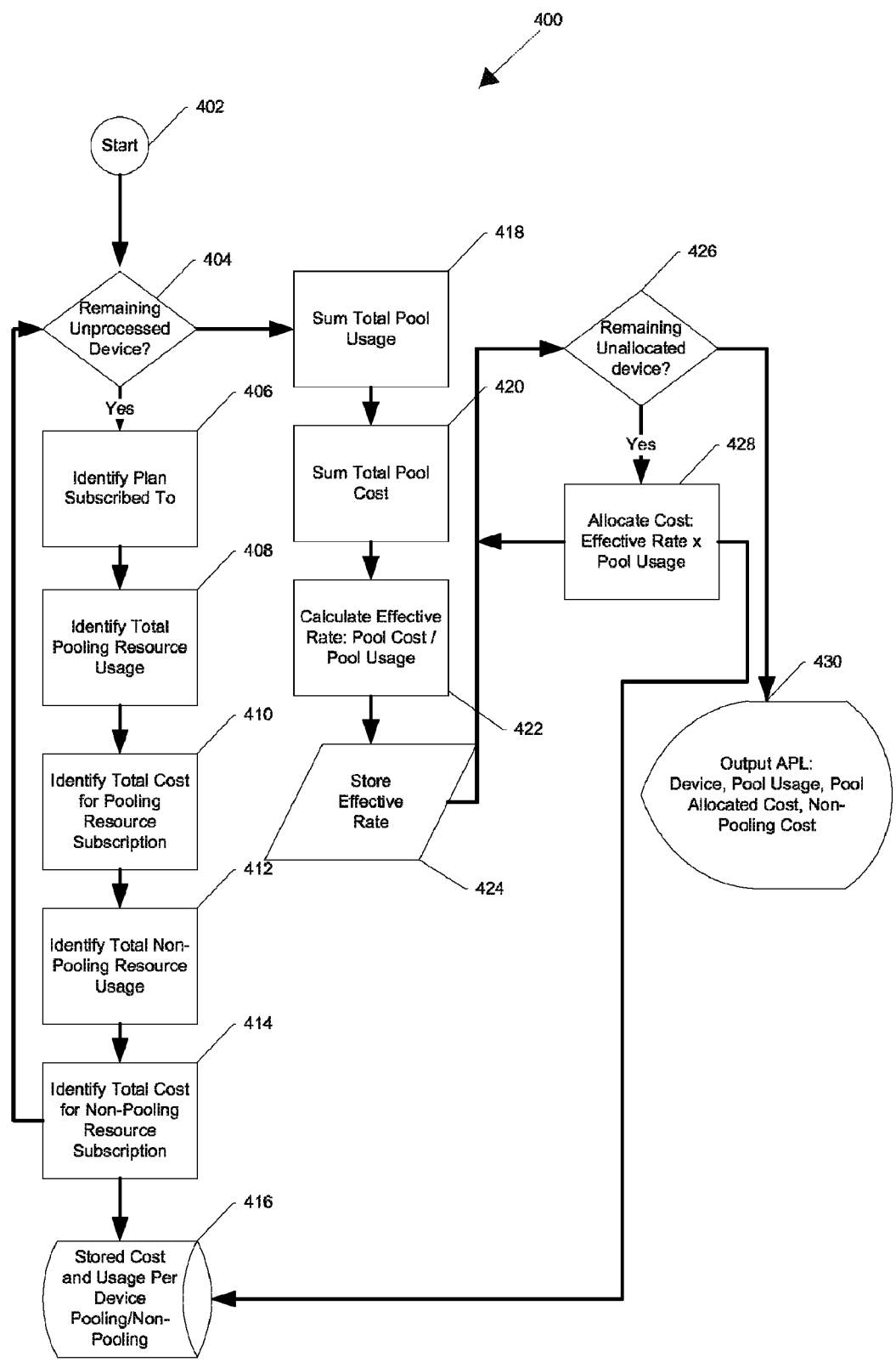
FIG. 4 is a flowchart of a first example of a method for creating the accounts payable ledger.

R. FIG. 4 Method for Creating the Accounts Payable Ledger

Turning now descriptively to the drawing, FIG. 4 illustrates a method 400 for creating the accounts hie ledger, showing the essential process steps in producing the output artifact from the usage analyzer.

The method for creating the accounts payable ledger 400 contains first a starting input 402 of the per-device usage records, indicating the total usage of the telecommunication service by each device, and the portion that is pooling shared or non-pooling.

From starting input 402, control flows to conditional check for remaining unprocessed device at step 404. If the conditional check for remaining unprocessed device 404 returns true or yes, let D denote that device identifier for explanatory convenience. Control proceeds to identify plan subscribed to 406 for device D where the subscription plan, denoted Plan (D) for explanatory convenience, is identified examination of the input records.

Control proceeds to identify total pooling resource usage at step 408 for device D where the quantity of pooling resource used, denoted PoolingUsed(D) for explanatory convenience, is identified by examination of the input records.

Control proceeds to identify total cost for pooling resource subscription at step 410 for device D where the cost of the subscription plan for pooling for device D, denoted PoolingCost(D) for explanatory convenience, is identified by examination of the input records.

Control proceeds to identify total non-pooling resource usage at step 412 for device D where the total amount of non-pooling resource usage for device D, denoted NonPoolingUsed(D) for explanatory convenience, is identified by examination of the input records.

Control proceeds to identify total cost for non-pooling resource subscription at step 414 for device D where the total cost for subscription to non-pooling resource usage for device D, denoted NonPoolingCost(D) for explanatory convenience, is identified by examination of the input records.

Control Proceeds to store the tuple of information <Plan (D), PoolingUsed(D), PoolingCost(D), NonPoolingUsed(D), NonPoolingCost(D)> for device D in stored cost and usage per device pooling/non-pooling at step 416, being a short-term state store or database. Control simultaneously returns to conditional check remaining unprocessed device at step 404 until no such device D exists.

If the conditional check for remaining unprocessed device at step 404 returns false or no, all devices are processed and stored in stored cost and usage per device pooling/non-pooling at step 416, and control proceeds to sum total pool usage at step 418. For explanatory convenience, let TotalPoolUsage denote this sum total. Sum total pool usage at step 418 calculates TotalPoolUsage=Sum(PoolingUsed(D)) for all devices D.

Control proceeds to sum total pool cost at step 420. For explanatory convenience, let TotalPoolCost denote this sum total. Sum total pool cost at step 420 calculates TotalPoolCost=Sum(PoolingCost(D)) for all devices D.

Control proceeds to calculate effective rate: pool cost/pool usage at step 422. For explanatory convenience, let EffectiveRate denote this ratio. Calculate effective rate: pool cost/pool usage calculates EffectiveRate=TotalPoolUsage/TotalPoolCost.

Control proceeds to store effective rate at step 424 where the value EffectiveRate calculated by calculate effective rate: pool cost/pool usage at step 422 is stored in temporary storage.

Control proceeds to the conditional check remaining unallocated device at step 426 that is a conditional check. If the conditional check remaining unallocated device at step 426 returns true or yes, let D denote that device identifier for explanatory convenience. Control proceeds to allocate cost: effective rate×pool usage at step 428. For explanatory convenience, let AllocatedPoolCost(D) denote the allocated pool cost for this device. Allocate cost: effective rate×pool usage at step 428 calculates AllocatedPoolCost(D)=PoolingUsed(D) *EffectiveRate.

Control proceeds to add AllocatedPoolCost(D) to the tuple of information for device D in stored cost and usage per device pooling/non-pooling step 416. Control simultaneously returns to conditional check remaining unallocated device at step 426 until no such device D exists.

If the conditional check for remaining unallocated device at step 426 returns false or no, control proceeds to output apl: device, pool usage, pool allocated cost, non-pooling cost at step 430. For each device D, Output the tuple <D Plan(D), PoolingUsed(D), AllocatedPoolCost(D), NonPoolingUsed(D), NonPoolingCost(D)>.

Figure 5:
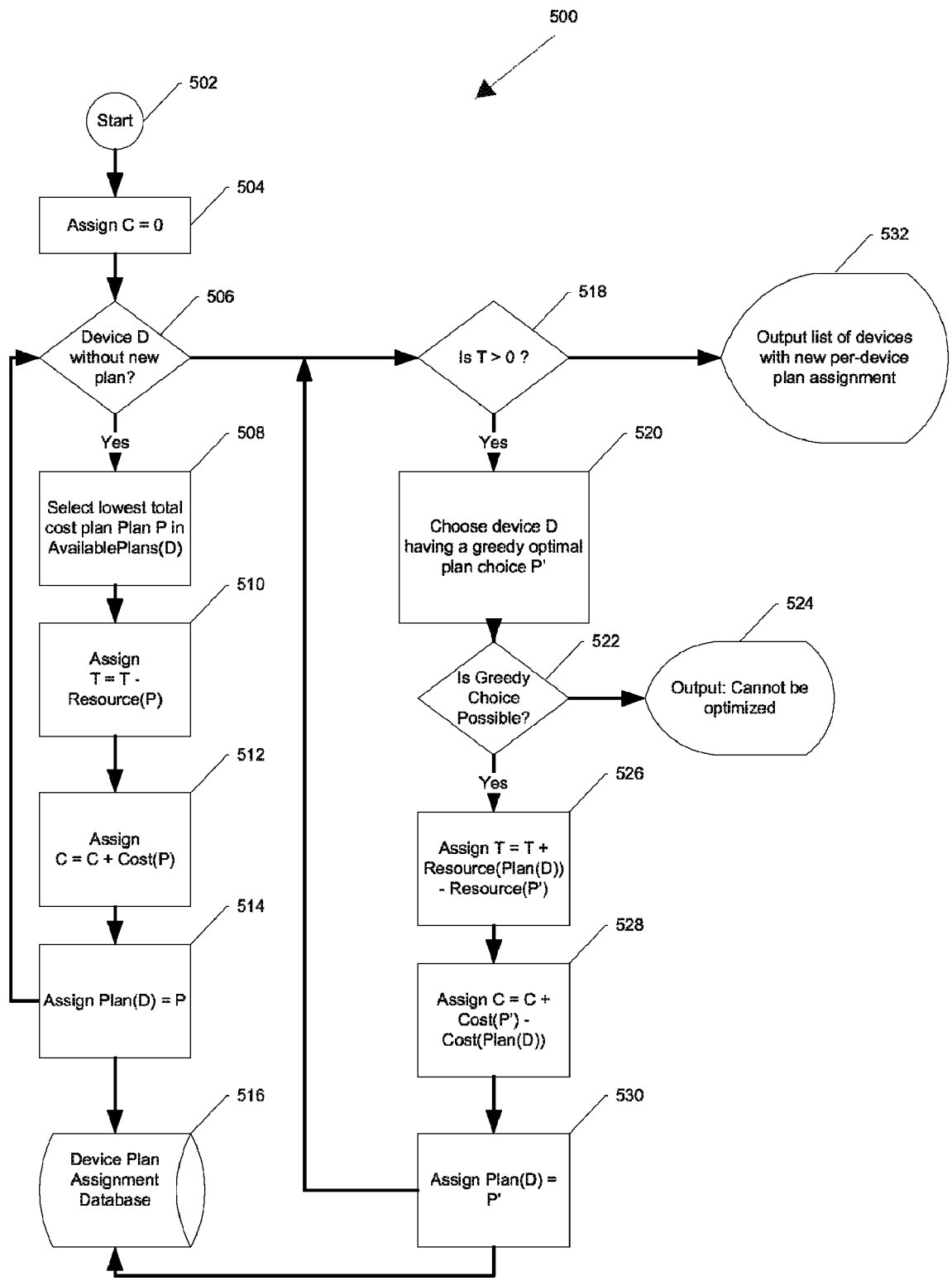
FIG. 5 is a flowchart of a first example of a greedy algorithm for pooling plan assignment.

S. FIG. 5 Method for Greedy Algorithm for Pooling Plan Assignment

Turning now descriptively to the drawing, FIG. 5 illustrates a method 500 for greedy algorithm for pooling plan assignment, showing the essential process steps in producing the output artifact from the resource planner.

The method for greedy algorithm for pooling plan assignment 500 contains first a starting input 502 of the usage allocation and profile records and service plan cost analysis records. For explanatory convenience, let this be a list L of devices, where for each device D in L, AvailablePlans(D) denotes the available service playas for device D as produced by the service plan optimizer. Let P be a plan in AvailablePlans(D); then let Resource (P) denote the amount of a pooling telecommunication service included with the subscription to plan P, and let Cost(P) be the subscription cost of plan P. Finally, let T be the target total of pooling resource required as set by the usage allocation and profile produced by the usage analyzer.

From starting input 502, control proceeds to assign C=0 at step 504. The cost variable C is assigned to a starting value of zero.

Control proceeds to the conditional check device D without new plan at step 506. If the conditional check for device D without new plan at step 504 returns true or yes, let D denote that device for explanatory convenience. Control proceeds to select lowest total cost plan P in AvailablePlans(D) at step 508. In this step, a plan P is selected of the allowed plans in the set AvailablePlans(D) having minimal Cost(P) regardless of Resource(P).

Control proceeds to Assign T=T−Resource(P) at step 510 where the total resource target T is reduced by Resource(P), the pooling telecommunication limit of plan P.

Control proceeds to Assign C=C+Cost(P) at step 512 where the total cost C is increased by Cost(P), the pooling cost of plan P.

Control Proceeds to assign Plan(D)=P at step 514. At this step, the plan P of minimal cost is assigned to device D, with the total resource requirement reduced and total cost C increased according to plan P.

Control proceeds to device plan assignment database at step 516 where the assignment of plan P to device D is stored in a short-term state store or database. Control simultaneously returns to conditional check device D without new plan at step 506.

If the conditional check for device D without new plan at step 506 returns false or no, control proceeds to conditional check is T>0 at step 518. If the conditional check is T>0 at step 518 returns true or Yes, control proceeds to choose device D having a greedy optimal plan choice P' at step 520. Let IncrementalResource(P') denote the difference between the resource subscription of device D to plan P' and device D's current plan subscription. In this step, device D and plan P' are chosen to satisfy the following requirements simultaneously:

Requirement 1: P' is in AvailablePlans(D), P' is a valid plan that device D can be subscribed to, Requirement 2: IncrementalResource (P')>0, i.e., P' is a subscription plan having a higher limit of pooling telecommunications resource than the current plan assigned to device D, Requirement 3: Cost(P')/Resource(P')<Cost (Plan(D))/Resource(Plan(D)) i.e., the cost per unit of P' is better than the cost per unit of the current plan that device D is subscribed to, and either Requirement 4: There exists no choice of D and P' such IncrementalResource(P')>T, and the selection of P' maximizes IncrementalResource(P'). Where there are multiple such options, choose the P' that minimizes Cost(P'), or Requirement 4-alt: There exists some choice of D and P' such that IncrementalResource(P')>T, and the selection of P' is such that IncrementalResource(P')>T but minimizes Cost (P').

Requirement 4 and 4-alt represent a greedy selection, where either the maximal amount of resource is allocated at the cheapest cost per unit, but remaining short of the goal of total resource requirements (Requirement 4) or the minimal cost resource that satisfies the remaining total resource requirement.

Control proceeds to conditional check is greedy choice possible at step 522. If the conditional check is greedy choice possible at step 522 returns false or no, control proceeds to output: cannot be optimized at step 524 and terminates. This represents the failure of choose device D having a greedy optimal plan choice P' step 520 to be able to select a device D and plan P' satisfying all of the requirements enumerated previously.

If the conditional check is greedy choice possible at step 522 returns true or yes, control proceeds to assign T=T+Resource(Plan(D))−Resource(P') at step 526. In this step, the resource target is decremented by IncrementalResource(P').

Control proceeds to as C=C+Cost(P')−Cost(Plan(D)) at step 528. In this step, the total cost is incremented by the difference in price between subscription plan P' and the current plan Plan(D) to which D is subscribed.

Control proceeds to assign Plan(D)=P' at step 530, where device D is subscribed to plan P'. Control proceeds to device plan assignment database at step 516, where the plan subscription for device D is stored with the new plan P'. Control proceeds simultaneously to conditional check is T>0 at step 518.

If conditional check is T>0 at step 518 returns false or no, control proceeds to output list of devices with new per-device plan assignment at step 532. In this step, final plan assignment Plan(D)) is output for each device D with total pooling plan cost C.

Another embodiment of the systems and methods described above includes a system for producing an exact charge back of costs per device by analyzing the usage of telecommunication service per device, producing an effective rate per unit of usage based on the ratio, of the total cost of telecommunication services purchased to the total units of telecommunication service used, computing the allocable portion of the total cost per device by the product of its per-unit usage and the effective rate, and providing this to the resource manager.

This embodiment of the system may be extended to allow for the input of usage data from two or more service providers offering substitute services and providing an effective rate across all services purchased.

This embodiment of the system may be extended to allow for the definition of cost centers, with an effective rate calculated per cost center and applied to all devices in the cost center, wherein a cost center represents a resource sharing pooling group, and the effective rate is calculated by the ratio of the total cost for the telecommunications service for all devices in the cost center to the total usage of the telecommunications service for all devices in the cost center.

This embodiment of the system may be extended to transmit to each agent the usage and charge back cost of that agent's device.

In this system embodiment, the telecommunications service may be wireless voice communication or wireless data communication.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A method for resource and utilization management of telecommunications devices within an enterprise, where the enterprise contracts for telecommunications service from one or more service providers, comprising the steps of:

receiving quantity data corresponding to the amount of telecommunications service used by the enterprise per period into a resource management system including a microprocessor executing programmed instructions;

grouping telecommunications devices into pools of shared use for the telecommunications service, the pools of shared use including one or more telecommunication devices;

analyzing for each telecommunications device, with the resource management system, telecommunications services plans available from the service providers to determine the total quantity of telecommunications service provided by the service providers and the cost per unit of telecommunications service;

selecting, with the resource manager, selected telecommunications service plans for each telecommunications device that accommodate a target quantity of projected telecommunications service use per period; and subscribing the telecommunications devices to the selected service plans.

2. The method of claim 1, wherein the target quantity per period is based on aggregate usage history.

3. The method of claim 1, further comprising transmitting to the resource manager the selected telecommunications service plans for each telecommunications device for which the enterprise is changing telecommunications service plan.

4. The method of claim 1, further comprising transmitting to the telecommunications service provider the selected telecommunications service plans for each telecommunications device for which the enterprise is changing telecommunications service plan.

5. The method of claim 1, further comprising assigning, with a microprocessor executing programmed instructions, total applicable tax factor to the service plans, the total applicable tax factor reflecting a tax rate for telecommunication service assigned to each telecommunications device based on the tax jurisdiction of each telecommunications device, wherein selecting selected telecommunication service plans includes minimizing the total applicable tax factor.

6. The method of claim 1, further comprising repeating the method of claim 1 on a periodic basis to manage resource and utilization of telecommunications devices on an ongoing basis.

7. The method of claim 1, wherein the telecommunications service is wireless voice communication or wireless data communication.

8. The method of claim 1, wherein there are two or more service providers offering telecommunications service plans that are substitutes for each other, and selecting selected telecommunications service plans includes selecting the lowest cost telecommunications service plan offered by the service providers.

9. The method of claim 1, wherein subscribing the telecommunications devices to the selected service plans includes updating a record associated with the telecommunications devices to reflect the tax jurisdiction where the telecommunications device is actually used.

10. A system for resource and utilization management of telecommunication devices an enterprise, comprising:

usage records from a service provider detailing telecommunication services used by enterprise members on their telecommunication devices;

a usage analyzer including a microprocessor executing programmed instructions to groups the telecommunication devices into resource sharing pooling groups for a given telecommunication service, with at least one telecommunication device per group;

where the usage analyzer is configured to compute a minimum quantity of telecommunication services per period required to be purchased;

a service plan optimizer including a microprocessor executing programmed instructions to compute an effective rate per unit of telecommunication services per period per plan; and a resource planner including a microprocessor executing programmed instructions to:

select selected telecommunications service plans for each telecommunications device based on the effective rate, where the selected telecommunications service plans provide at least the minimum quantity of telecommunication services per period, communicate to service providers requests to change a given telecommunications service plan, and communicate to the resource manager instructions to assigns different telecommunications service plans to telecommunications devices.

11. The system of claim 10, wherein the usage analyzer is programmed to use an account history to provide seasonally-adjusted telecommunication service requirements.

12. The system of claim 11, further comprising:

a service plan optimizer including a microprocessor with programmed instructions to determine an effective rate of cost per unit of telecommunication services per period per service plan per tax jurisdiction based on data corresponding to the cost of the service plans and an effective tax rate per telecommunications device, where the effective tax rate accounts for taxes to which the telecommunications devices will be subject; and a resource planner including a microprocessor with programmed instructions to assign service plans to each telecommunications device by minimizing the effective rate of cost for each telecommunications device total unit cost including taxes.

13. The system of claim 10, wherein the telecommunications service is wireless voice communication or wireless data communication.

14. The system of claim 10, further comprising an electronic billing record for each telecommunications device.

15. The system of claim 10, wherein the usage analyzer is programmed to generate an accounting of telecommunication service allocated to each telecommunications device based on each telecommunication device's proportional share of the total telecommunication service purchased.

16. The system of claim 15, wherein taxes and surcharges are allocated to each telecommunications device proportional to the telecommunication service allocated to each telecommunications device.

17. The system of claim 15, wherein the resource planner is programmed to output to the resource manager the telecommunications service allocated to each telecommunications device and an allocated telecommunications service cost calculated by dividing the telecommunications service allocated to each telecommunications device by the total cost of the telecommunications service.

18. The system of claim 17, wherein the usage records include separately itemized details of supplemental telecommunications services independently ordered by enterprise members for their telecommunications devices.

19. The system of claim 10, wherein the usage records include usage data from two or more service providers offering substitute telecommunications services.

20. The system in claim 10, therein the resource planner is programmed to electronically enumerate telecommunications devices and new service plan subscriptions.

21. The system in claim 10, wherein the resource planner includes instructions to update the tax jurisdiction of a given telecommunications device to the service provider to reflect where the telecommunications device is actually being used.

* * * * *